United States Patent
Subrahmanyan (10) Patent No.: US 7,372,660 B1
(45) Date of Patent: May 13, 2008

(54) DISC STORAGE SYSTEM WITH ADAPTIVE PID CONTROL

(75) Inventor: Pradeep K. Subrahmanyan, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1566 days.

(21) Appl. No.: 09/767,546

(22) Filed: Jan. 23, 2001

Related U.S. Application Data (60) Provisional application No. 60/180,752, filed on Feb. 7, 2000.

(51) Int. Cl.
*G11B 5/596* (2006.01)

(52) U.S. Cl. .............................. 360/78.09; 360/78.04; 318/561

(58) Field of Classification Search ............ 360/78.04, 360/78.06, 78.07, 78.09, 77.02, 77.04; 318/560, 318/561
See application file for complete search history.

(56) References Cited

U.S. PATENT DOCUMENTS

| | | | |
|---|---|---|---|
| 4,697,127 A | 9/1987 | Stich et al. ................. | 318/561 |
| 5,101,472 A * | 3/1992 | Repperger .................. | 700/261 |
| 5,132,855 A | 7/1992 | Waugh et al. ............ | 360/78.07 |
| 5,150,266 A | 9/1992 | Albert ..................... | 360/78.04 |
| 5,155,422 A * | 10/1992 | Sidman et al. .............. | 318/560 |
| 5,189,571 A | 2/1993 | Murphy et al. ............... | 360/75 |
| 5,369,345 A | 11/1994 | Phan et al. .................. | 318/561 |
| 5,828,515 A | 10/1998 | Kim ........................ | 360/78.06 |
| 5,847,895 A | 12/1998 | Romano et al. ......... | 360/78.09 |
| 5,875,162 A * | 2/1999 | Baba ....................... | 369/44.35 |
| 5,898,286 A * | 4/1999 | Clare et al. ................. | 318/569 |
| 5,917,672 A | 6/1999 | Pham et al. ............. | 360/78.09 |
| 5,936,792 A | 8/1999 | Kobayashi et al. ...... | 360/78.07 |
| 5,956,201 A | 9/1999 | Pham et al. ............. | 360/78.09 |
| 6,013,995 A | 1/2000 | Kim ........................... | 318/561 |
| 6,052,252 A | 4/2000 | Kim ........................ | 360/78.09 |
| 6,583,964 B1 * | 6/2003 | Huang et al. ............ | 360/294.4 |

* cited by examiner

*Primary Examiner*—Andrew L. Sniezek
(74) *Attorney, Agent, or Firm*—Westman, Champlin & Kelly (57) ABSTRACT

A disc drive controller circuit for an actuator receives reference data indicating a desired actuator position "$\theta_d$", error data indicating a difference "e" between the desired actuator position and a sensed actuator position "$\theta$", and adaptive parameter data "$\hat{A}$". The controller circuit calculates a circuit output "u" that drives the actuator. The controller circuit derives the circuit output "u" according to a formula:

$$\hat{A}(\ddot{\theta}_d + 2\lambda \dot{e} + \lambda^2 e) + k\left(\dot{e} + 2\lambda e + \lambda^2 \int_0^t e\, d\tau\right)$$

in which "$\lambda$" is a controller zero value and "k" is a controller gain value and "t" is time. The adaptive parameter $\hat{A}$ is updated in general accordance with the formula:

$$\hat{A}(k) = e_1 e_2 \Delta t + \hat{A}(k-1).$$

14 Claims, 7 Drawing Sheets

DISC STORAGE SYSTEM WITH ADAPTIVE PID CONTROL

CROSS REFERENCE TO RELATED APPLICATION

This application claims priority benefits from U.S. Provision Application 60/180,752 titled ADAPTIVE PROPORTIONAL-INTEGRAL-DERIVATIVE (PID) CONTROL, filed Feb. 7, 2000.

FIELD OF THE INVENTION

The invention relates to disc storage systems. In particular, the invention relates to use of adaptive control systems and methods of controlling actuators that position heads in disc drives.

BACKGROUND OF THE INVENTION

Control systems are used in controlling actuators that position read/write heads over selected tracks of a disc drive, as well as in other applications. When the actuator's gain or other characteristics are non-linear due to end effects or leakage flux, or vary undesirably with temperature or some other environmental condition, then a controller will often be used that adapts its controller parameters in real time to compensate for the uncertain variations. Such "adaptive controllers" are typically realized as discrete (digital) controllers. The controllers are often complex and require that complex and lengthy calculations be completed in a very short time in order to achieve rapid actuator movements with short settling times and stability over the entire operating range. In particular, with the use of newer high density recording media in disc drives, improved controller performance is needed to meet more stringent positioning and speed requirements. Completing the lengthy and complex calculations in a short time requires high memory use and high clock speeds leading to undesirable high power consumption and heating in the controller. An adaptive controller for an actuator is desired that has reduced computational overhead and reduced power consumption, while achieving rapid, precise and stable control of the actuator.

SUMMARY OF THE INVENTION

Disclosed is a disc drive and method for a disc drive controller. The disc drive comprises a disc pack, an actuator with an actuator position controllable by a control signal u, and a read/write head coupled to the disc pack and the actuator. The read/write head provides a signal representing a sensed actuator position "θ". The disc drive also comprises a controller circuit. The controller circuit receives the signal representing the sensed actuator position "θ". The controller circuit also receives reference data indicating a desired actuator position "$\theta_d$", and includes stored adaptive parameter data "Â". The controller circuit generates the output u derived from the formula:

$$\hat{A}(\ddot{\theta}_d + 2\lambda\dot{e} + \lambda^2 e) + k\left(\dot{e} + 2\lambda e + \lambda^2 \int_0^\tau e\, d\tau\right)$$

in which "λ" is a controller zero value, "k" is a controller gain value, "t" is time, and "e" is a difference between the desired actuator position $\theta_d$ and the sensed actuator position "θ". The method provides rapid, precise and stable control of the actuator in the disc drive.

In one embodiment, the controller circuit is a discrete controller with reduced computational overhead and reduced power consumption.

In another embodiment, instructions are stored in a computer readable program storage device which tangibly embodies a program of instructions executable by a processor to perform the controller process.

These and various other features as well as advantages which characterize the present invention will be apparent upon reading of the following detailed description and review of the associated drawings.

DETAILED DESCRIPTION OF THE ILLUSTRATED EMBODIMENTS

Figure 1:
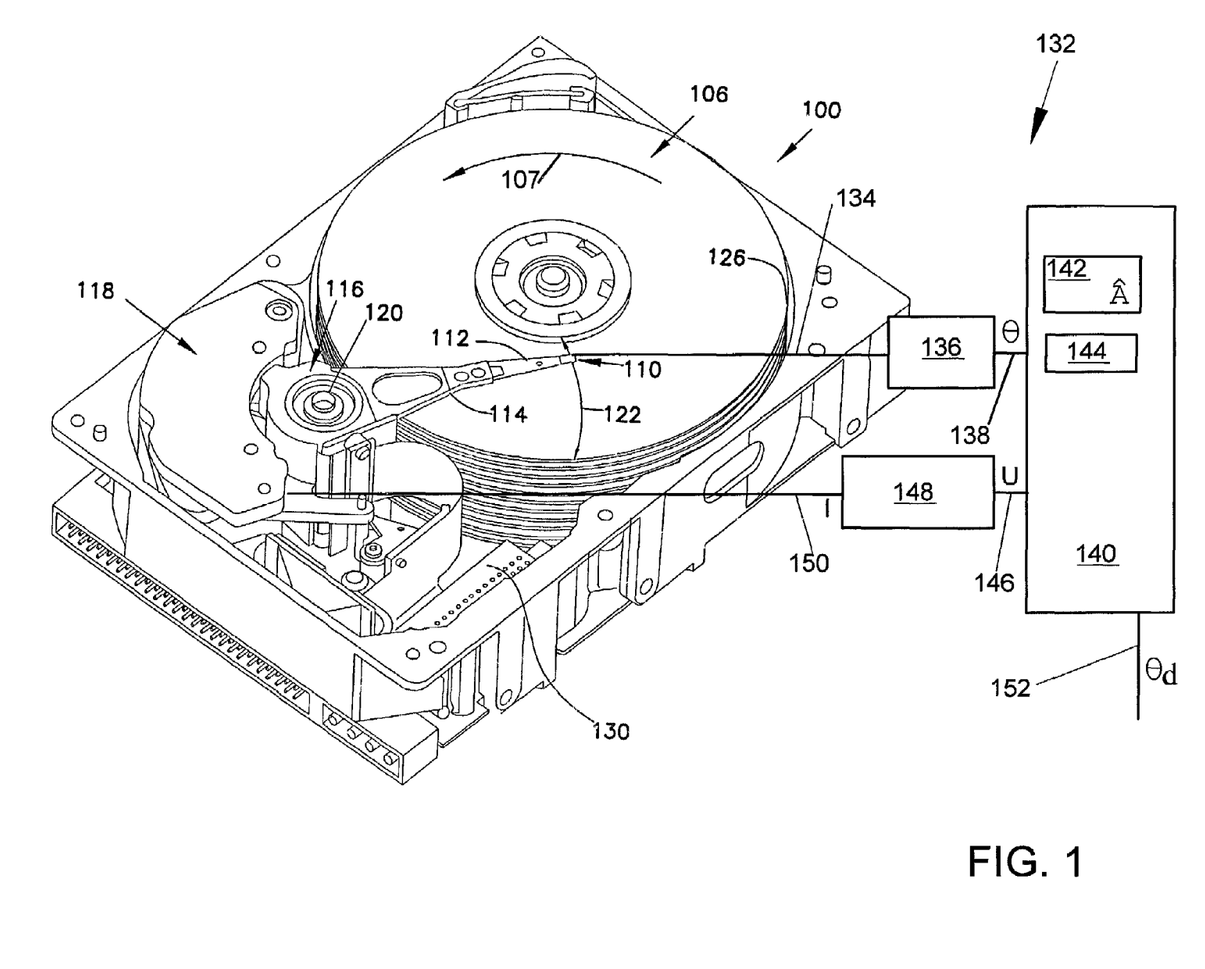
FIG. 1 illustrates a first embodiment of a disc drive including an adaptive controller.

In FIG. 1, an embodiment of a disc drive 100 is illustrated. Disc drive 100 includes a disc pack 126 having storage surfaces 106 which are typically layers of magnetic material. The disc pack 126 includes a stack of multiple discs and the read/write head assembly includes a read/write transducer 110 for each stacked disc. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126.

Typically, the actuation of read/write head assembly 112 is provided by a voice coil motor 118. Voice coil motor 118 includes a rotor 116 that pivots on axle 120 and an arm 114 that actuates the read/write head assembly 112.

Disc drive 100 includes a disc driver controller at location 130. A portion 132 of the disc driver controller that controls the actuation of the read/write head assembly 112 is broken out and illustrated schematically on the right side of FIG. 1. One or more of the read/write transducers 110 provide data indicating a sensed actuator position θ on line 134 to a demodulator 136. Demodulator 136 demodulates the sensed actuator position θ, putting the data in a digital form that is coupled along line 138 to processor 140. Processor 140 includes RAM 142 and ROM 144 and generates a signal u on line 146 for controlling the voice coil motor 118. The signal u on line 146 is amplified by power amplifier 148. Power amplifier 148 provides an output current "I" that couples along line 150 to the voice coil motor 118 and controls the angular or mechanical position $\theta_M$ of read/write head assembly 112 of the voice coil motor 118. Digital processor 140 includes a setpoint input 152 that receives reference data, typically from a CPU of a personal computer, indicating a desired actuator position $\theta_d$. ROM 144 stores an adaptive controller process or algorithm that controls the read/write head position $\theta_M$ so that data can be read or written on the desired track on the storage surfaces 106 of disc pack 126. The RAM 142 stores adaptive parameter data Â used by the adaptive controller process. The adaptive controller process stored in ROM 144 provides improved control of voice coil motor 118 and is described in more detail below in connection with FIGS. 2-12. It will be understood by those skilled in the art that the processor 140 can execute other support functions for the disc drive 100 as well.

Figure 2:
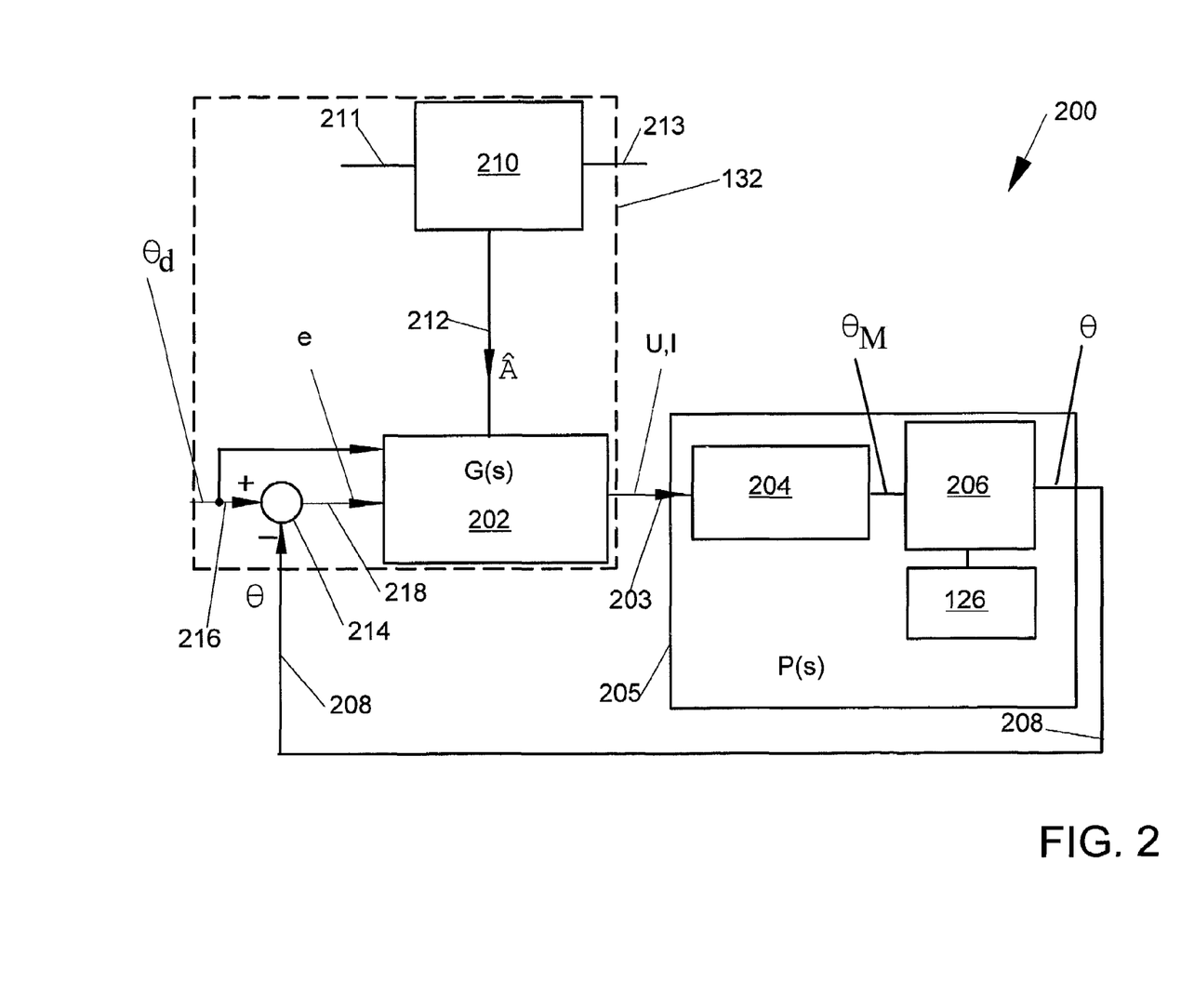
FIG. 2 illustrates a second embodiment of a disc drive including an adaptive controller.

In FIG. 2, a block diagram of an embodiment of a disc drive 200 including an adaptive controller 202 is illustrated. An actuator or voice coil motor 204 controls the angular or mechanical position $\theta_M$ of a read/write head 206. The read/write head 206 and its associated read/write circuit sense positional data stored on disc pack 126 and generate data indicating a sensed head or actuator position $\theta$ on line 208. The voice coil motor 204 and the read/write head and associated read/write circuit 206 are described herein as a controlled system or "plant" 205 with a transfer function P(s), expressed in terms of the Laplace transform variable "s" and explained in more detail below in connection with Equations 1 and 2. The voice coil motor 204 is controlled by a motor current "I" (an amplified form of the control signal "u") received from the adaptive controller 202 on line 203. The adaptive controller 202 has an adaptive control transfer function G(s) that is explained in more detail below in connection with FIG. 3. An adaptive system 210 provides the adaptive controller 202 with adaptive parameter data Â along line 212. Adaptive system 210 calculates and stores the adaptive parameter data Â in real time as a function of inputs on input lines 211, 213. Typically, input line 211 is coupled to position error signal e on line 218, and the input line 213 is coupled to the setpoint $\theta_d$ on line 216. The adaptive parameter data Â is calculated as a function of $\theta_d$ and e that requires little computational overhead and draws low power while providing real time updates. A summing point 214 receives reference data indicating a setpoint or desired actuation position $\theta_d$ on line 216 and the sensed actuator position $\theta$ on line 208 and generates a position error signal $e=(\theta_d-\theta)$ on line 218 that couples to the adaptive controller 202. The setpoint $\theta_d$ on line 216 also couples to the adaptive controller 202 to provide feedforward compensation for changes in the setpoint. The adaptive controller 202 functions approximately according to Equation 22 below. Equation 22 is expressed in time domain terms (rather than the Laplace variable "s") and one dot over a variable indicates a first derivative with respect to time "t", and two dots over a variable indicates a second derivative with respect to time "t" according to the usual mathematical conventions. The variable time is labeled tau ($\tau$) within the integral expression. In Equation 22, the constant $\lambda$ is a controller zero (i.e., where $s=-\lambda$) and the constant "k" is a controller gain. It is understood that while Equation 22 is expressed in continuous terms, that Equation 22 can also be implemented using known digital or discrete controller functions selected to replicate the continuous terms. Such a discrete embodiment is explained in more detail below in connection with FIG. 6.

Figure 3:
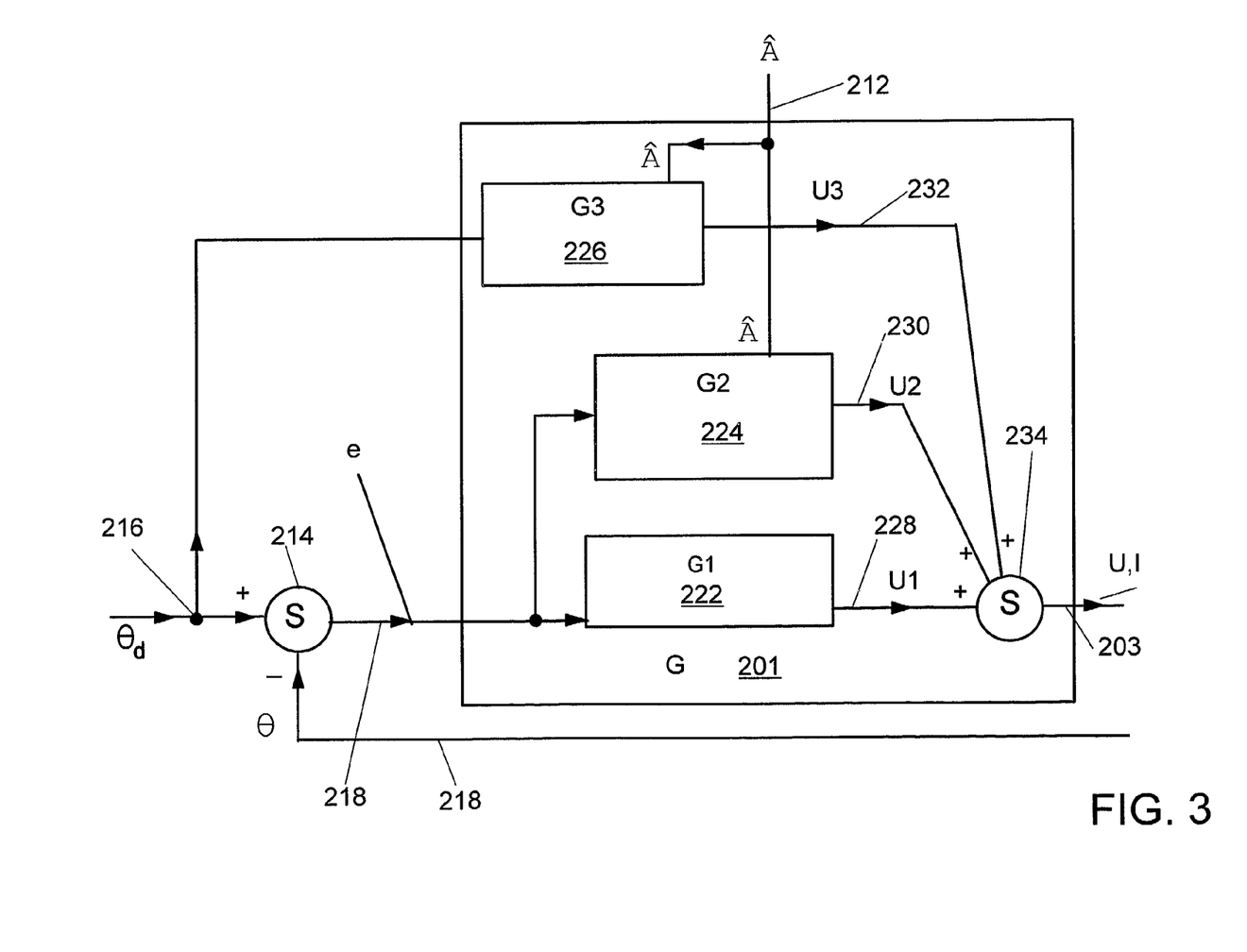
FIG. 3 illustrates an embodiment of an adaptive controller

In FIG. 3, an embodiment of an adaptive controller 201 is illustrated, and controller 201 can be used in place of adaptive controller 202 in FIG. 2. In FIG. 3, the same reference numerals used in FIG. 2 are used to identify similar or identical features. The adaptive controller 201 includes a nominal controller 222 with a transfer function G1 and a controller output U1 at 228, an "algebraic part" controller 224 with a transfer function G2 and a controller output U2 at 230, and a feedforward controller 226 with a transfer function G3 and a controller output U3 at 232. The controller outputs U1, U2, U3 are summed at summing point 234 which provides the control signal u (or amplified, the motor current I) on line 203. The transfer functions G1, G2, G3 are explained in more detail below in connection with Equations 3-21.

Equations 1 and 2 illustrate the characteristics of the plant 205 illustrated in FIG. 2.

$$P(s) = \frac{\theta(s)}{i(s)} = \frac{K_t}{Js^2} = \frac{1}{As^2} \qquad \text{Eq. 1}$$

$$\ddot{\theta} = \frac{u}{A} \qquad \text{Eq. 2}$$

As shown in Equation 1, the plant has a transfer function P(s) that is the ratio of the sensed position $\theta(s)$ of the read/write head assembly to the actuator current i(s). In Equation 1, the ratio is shown to be a function of the torque "constant" $K_t$ of the voice coil motor and the polar moment of inertia J of the voice coil motor. The torque "constant" $K_t$ is found to not be constant, but to vary undesirably over the stroke of the voice coil motor due to end effects and leakage flux in the magnetic circuit of the voice coil motor. The ratio $J/K_t$ is represented by "A" in Equations 1 and 2. The nominal controller 222 is arranged using a nominal value of A, but use of only this nominal value could lead to an unstable system due to changes in A. To avoid this unstable system condition, the controller is reparameterized to be dependent on the value of A. This reparameterization is done in the algebraic part controller 224. The value of A is unknown in practice, and an adaptive parameter Â, which is an estimate of A, is used instead. The resulting arrangement forms a stable system. The adaptive portion corrects for the varying torque constant $K_t$ of the voice coil motor. In Equation 1, the voice coil motor characteristics are shown in terms of the Laplace operator s, and in Equation 2, the voice coil motor characteristics are shown in terms of time, with the motor current or control signal represented by u, and the sensed position of the read/write head assembly represented by $\theta$. The two dots over $\theta$ indicate a second derivative (acceleration) in accordance with mathematical convention.

Equations 3-11 show the operating characteristics of the nominal controller 222 in FIG. 3.

$$F_T(t) = k_p e + k_d \dot{e} + k_i \int_0^t e \, d\tau \qquad \text{Eq. 3}$$

Equation 3 is in the time domain and shows the calculation of a torsional force component, or torque, $T_F$ produced by voice coil motor 204 due to the output U1 on line 228 from the nominal controller G1. Equation 3 includes a proportional constant $k_p$, a derivative constant $k_d$, and an integral constant $k_i$. As can be seen from Equation 3, nominal controller 222 is a proportional-integral-derivative(PID) type of controller.

$$G(s) = \frac{F_T(s)}{e(s)} = \left(k_p + k_d s + \frac{k_i}{s}\right) \qquad \text{Eq. 4}$$

Equation 4 expresses the same PID controller characteristics as those expressed in Equation 3, however, in the Laplace transform domain.

$$k_p = 2\lambda k \qquad \text{Eq. 5}$$

$$k_d = k \qquad \text{Eq. 6}$$

$$k_i = \lambda^2 k \qquad \text{Eq. 7}$$

It is found that the nominal controller is easier to implement when the constants $k_p$, $k_d$ and $k_i$ are interrelated as shown in Equations 5, 6, 7, where k is the gain of the nominal controller 222 and $\lambda$ is a controller zero as illustrated in Equation 8.

$$G(s) = \frac{k(s+\lambda)^2}{s} \qquad \text{Eq. 8}$$

Equation 9 is the characteristic polynomial of the closed loop system which is used in evaluating closed loop stability using the Routh stability criteria.

$$As^3 + ks^2 + 2\lambda ks + k\lambda^2 = 0 \qquad \text{Eq. 9}$$

Application of the Routh stability criteria leads to the requirement for stability shown in Equation 10 which is an inequality.

$$(k)(2\lambda k) > (A)(\lambda^2 k) \qquad \text{Eq. 10}$$

Equation 10 illustrates that there is a range of values of k (from Equation 8) that will ensure stability in closed loop control by the nominal controller 222. However, calculation of k requires knowledge of the value of A, which at any given instant of time is not precisely known because the torque constant of the voice coil motor varies with position. To overcome this problem, a nominal, fixed value A is chosen for calculating k. The selection of k as a function of A is illustrated in Equation 11.

$$k > \frac{\lambda A}{2} \qquad \text{Eq. 11}$$

The tracking performance of the closed loop system is illustrated by the complementary sensitivity function T(s) shown in Equation 12.

$$T(s) = \frac{G_1(s)P(s)}{1 + G_1(s)P(s)} = \frac{k(s+\lambda)^2}{As^3 + k(s+\lambda)^2} \qquad \text{Eq. 12}$$

To ensure that the plant output θ(t) tracks the reference signal $\theta_d(t)$, the reference input r(s) to the closed loop system is set as shown in Equations 13, 14, 15 and 16, where $T^{-1}(s)$ is the inverse of the complementary system function T(s).

$$r(s) = T^{-1}(s)\theta_d(s) \qquad \text{Eq. 13}$$

$$= \frac{1 + G_1(s)P(s)}{G_1(s)P(s)}\theta_d(s) \qquad \text{Eq. 14}$$

$$= \theta_d(s) + As^2 G_1^{-1}(s)\theta_d(s) \qquad \text{Eq. 15}$$

Equation 16 illustrates that improved tracking can be obtained by providing feedforward compensation of the desired rotational acceleration as indicated by the second derivative of the reference signal $\theta_d$.

$$r(s) = \theta_d(s) + G_1^{-1}(s)A\ddot{\theta}_d(s) \qquad \text{Eq. 16}$$

This feedforward compensation is provided by the feedforward controller 226 of FIG. 3.

Figure 4:
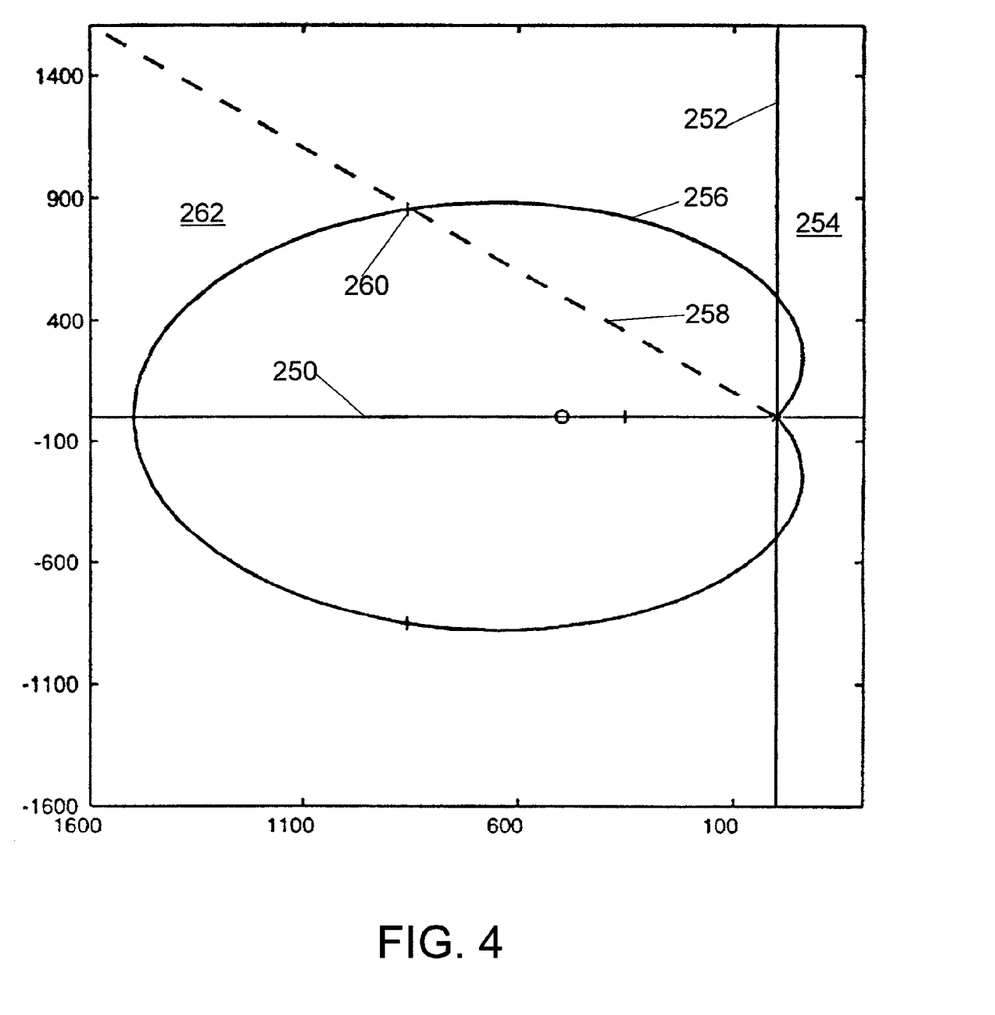
FIG. 4 illustrates a root locus analysis for the nominal PID controller.
Figure 5:
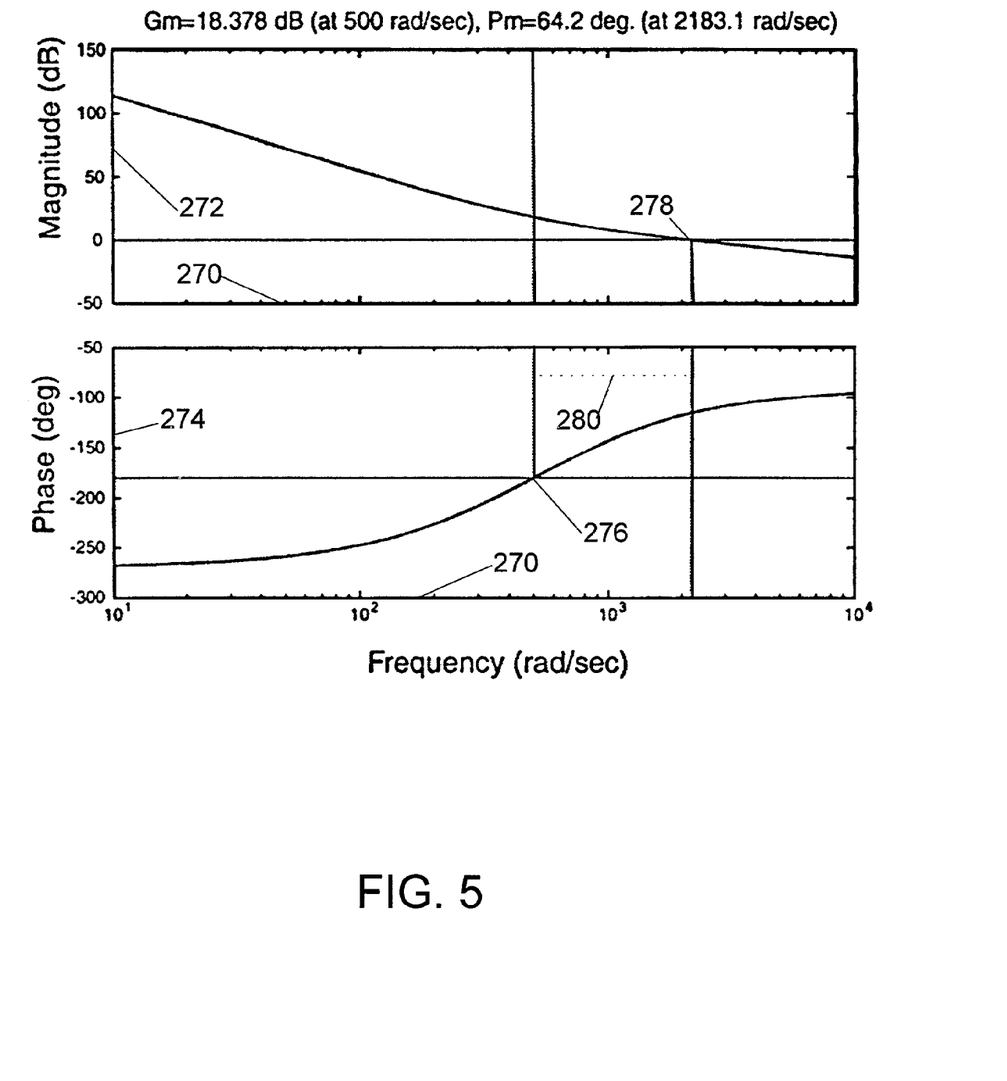
FIG. 5 illustrates a loop shape or Bode plot for the nominal controller.

An example of a root locus of the closed loop system in Equation 12 is illustrated in FIG. 4. In FIG. 4, the horizontal axis 250 represents real components. The vertical axis 252 represents imaginary components, in other words components that are orthogonal to the real components. The right half plane 254 is the portion of the plot to the right of the vertical axis 252. The root locus plot is the continuous curved line 256. A straight line 258 is constructed passing through the origin. In this example, the slope of the straight line 258 is set to be unity to provide a damping ratio of 0.707. The intersection 260 of the straight line 258 and the curved line 256 in the left half plane 262 determines the closed loop poles. From the root locus plot it can be seen that the closed loop system is conditionally stable with the root locus migrating to the right half plane for some values of the controller gain K. There are, however, values of K that can be selected in this example for which the root locus is in the left half plane, or stable. These values of K are indicated by Equation 11.

Figure 7:
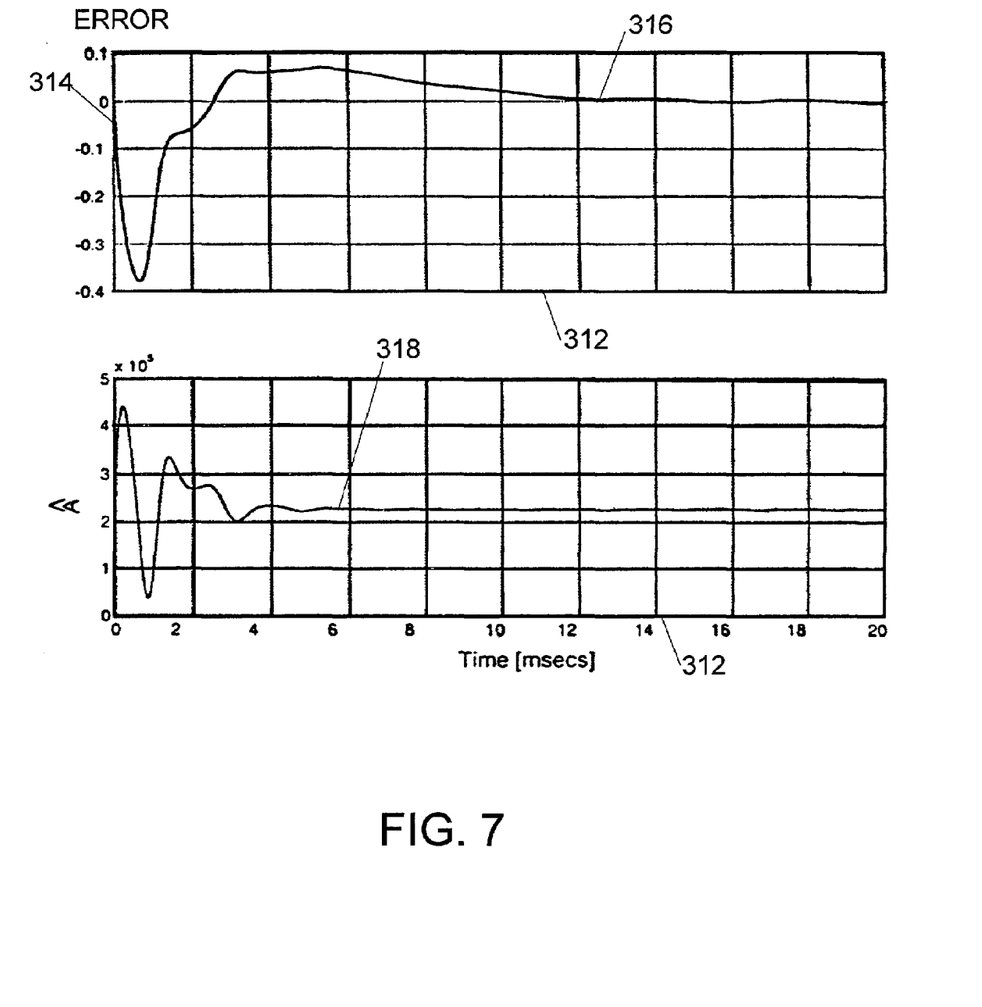
FIG. 7 illustrates computer simulated performance of the adaptive control system.

In FIG. 7, the resulting loop shape or Bode plot for the nominal controller 222 is illustrated. In FIG. 7, the horizontal axes 270 represent frequency in radians per second. The vertical axis 272 represents amplitude in decibels. The vertical axis 274 represents phase angle in degrees. It can be seen in FIG. 7 that the phase angle crosses over –180 degrees (polarity reversal) at 276, giving a gain margin of about 18.4 dB. The gain crosses over zero decibels at 278, leading to a phase margin of about 65 degrees. However, these stability margins depend on the nominal value of A. As a first step to controlling with A somewhat unknown, the controller is parameterized explicitly in terms of A. This is done in the so-called "algebraic part" controller 224.

Equations 17, 18, 19, 20 and 21 illustrate the operation of the "algebraic part" controller 224 in more detail. The algebraic part controller 224 has a transfer function $G2(s) = A(2\lambda s + \lambda^2)$. When the algebraic part controller 224 is combined with the nominal controller 222 as shown in FIG. 3, the combined transfer function $G1(s) + G2(s)$ is shown in Equation 17.

$$G_1(s) + G_2(s) = \frac{(k + 2\lambda A)s^2 + (2\lambda k + \lambda^2 A)s + k\lambda^2}{s} \qquad \text{Eq. 17}$$

The characteristic equation of the combined controller (nominal controller 222 and algebraic part controller 224) is shown in Equation 18.

$$As^3 + (k+2\lambda A)s^2 + (2\lambda k + \lambda^2 A)s + k\lambda^2 = 0 \qquad \text{Eq. 18}$$

The stability conditions for the combined controller are illustrated in Equations 19, 20 and 21.

$$(k+2\lambda A)(2\lambda k + \lambda^2 A) > (A)(k\lambda^2) \qquad \text{Eq. 19}$$

$$2\lambda k^2 + \lambda^2 Ak + 4\lambda^2 Ak + 2\lambda^3 A^2 > Ak\lambda^2 \qquad \text{Eq. 20}$$

$$2\lambda k^2 + 4\lambda^2 Ak + 2\lambda^3 A^2 > 0 \qquad \text{Eq. 21}$$

Equation 21 is true for all values of $\lambda$, A, and K, since $\lambda$, A, and K are all positive in a physically realizable system.

The actual plant parameter A is replaced in the algebraic part controller by its estimate Â and the resulting system remains stable. In Equation 22 is a complete equation in the time domain for the complete adaptive controller 201, including the nominal controller 222, the algebraic part controller 224 and the feedforward controller 226. As can be seen from Equation 22, the complete adaptive controller 201 makes calculations based on the position error signal e and the setpoint $\theta_d$. In Equation 23, the Equation 22 is expressed in a simplified form involving only two error terms $e_1$ and $e_2$.

$$u = \overbrace{\hat{A}(\ddot{\theta}_d + 2\lambda\dot{e} + \lambda^2 e)}^{e2} + \overbrace{k\left(\dot{e} + 2\lambda e + \lambda^2 \int_0^t e\,d\tau\right)}^{e1} \qquad \text{Eq. 22}$$

$$= \hat{A}e_2 + ke_1 \qquad \text{Eq. 23}$$

Equation 24 repeats the plant relationship set forth above in Equation 2.

$$\ddot{\theta} = \frac{u}{A} \qquad \text{Eq. 24}$$

Equations 23 and 24 are combined with one another to form Equation 25 which expresses the acceleration of the head position in terms of the two error terms $e_1$ and $e_2$, k and Â.

$$\ddot{\theta} = \frac{1}{A}[\hat{A}e_2 + ke_1] \qquad \text{Eq. 25}$$

Adding the quantity $-e_2$ to both sides of Equation 25 and collecting terms results in Equation 26.

$$\ddot{\theta} - e_2 = \frac{1}{A}[\hat{A}e_2 - Ae_2 + ke_1] \qquad \text{Eq. 26}$$

Substituting the definition of $e_2$ (taken from Equations 22, 23) into the left side of Equation 26 results in Equation 27.

$$\ddot{\theta} - \ddot{\theta}_d - 2\lambda\dot{e} - \lambda^2 e = \frac{1}{A}[\hat{A}e_2 - Ae_2 + ke_1] \qquad \text{Eq. 27}$$

Next, an error estimate Ã is defined as Ã (Â−A) and the error estimate is substituted into the right half of Equation 27, and the summing point equation $e=(\theta - \theta_d)$ from summing point 214 is substituted into the left half of Equation 27 resulting in Equation 28.

$$-\ddot{e} - 2\lambda\dot{e} - \lambda^2 e = \frac{1}{A}[\tilde{A}e_2 + ke_1] \qquad \text{Eq. 28}$$

The left side of Equation 28 is $-\dot{\theta}_1$ from differentiation of the definition of $e_1$ in Equations 22, 23. Substituting $-\dot{\theta}_1$ for the left hand side of Equation 28 and rearranging terms on the right hand side of Equation 28 results in Equation 29.

$$\Rightarrow -\dot{e}1 = \frac{k}{A}e_1 + \frac{\tilde{A}}{A}e_2 \qquad \text{Eq. 29}$$

Equation 29 is in the form of an "error model 3" as described in "Stable Adaptive Systems" by K. S. Narendra and A. M. Annanswamy, Prentice Hall, Englewood Cliffs, N.J., 1993. In this error model format, an update algorithm for A is Ã=sgn(1/A) $e_1 e_2$ as shown in Equation 30.

$$\tilde{A} = \text{sgn}\left(\frac{1}{A}\right)e_1 e_2 \qquad \text{Eq. 30}$$

Since the plant parameter A is always positive definite, the update algorithm becomes simply Ã=$e_1 e_2$ as shown in Equation 31.

$$\tilde{A} = e_1 e_2 \qquad \text{Eq. 31}$$

The operation of the adaptive system 210 of FIG. 2 can thus use this mathematically simple update Equation 31 to generate real time values of Â on line 212. The simplicity of Equation 31 leads to reduced power consumption to perform the calculation. Equation 32 illustrates a discrete form of the update equation with an update time $\Delta_t$ between updates.

$$\hat{A}_N = e_1 e_2 \Delta T + \hat{A}_{N-1} \qquad \text{Eq. 32}$$

With the adaptive system 210 updated in this manner, the tracking error for the adaptive controller 201 tends to approach zero by choosing a proper Lyapunov function of the error $e_1$ and the parameter error Ã and subsequent application of Barbalatt's lemma as explained in the above cited "Stable Adaptive Systems."

Figure 6:
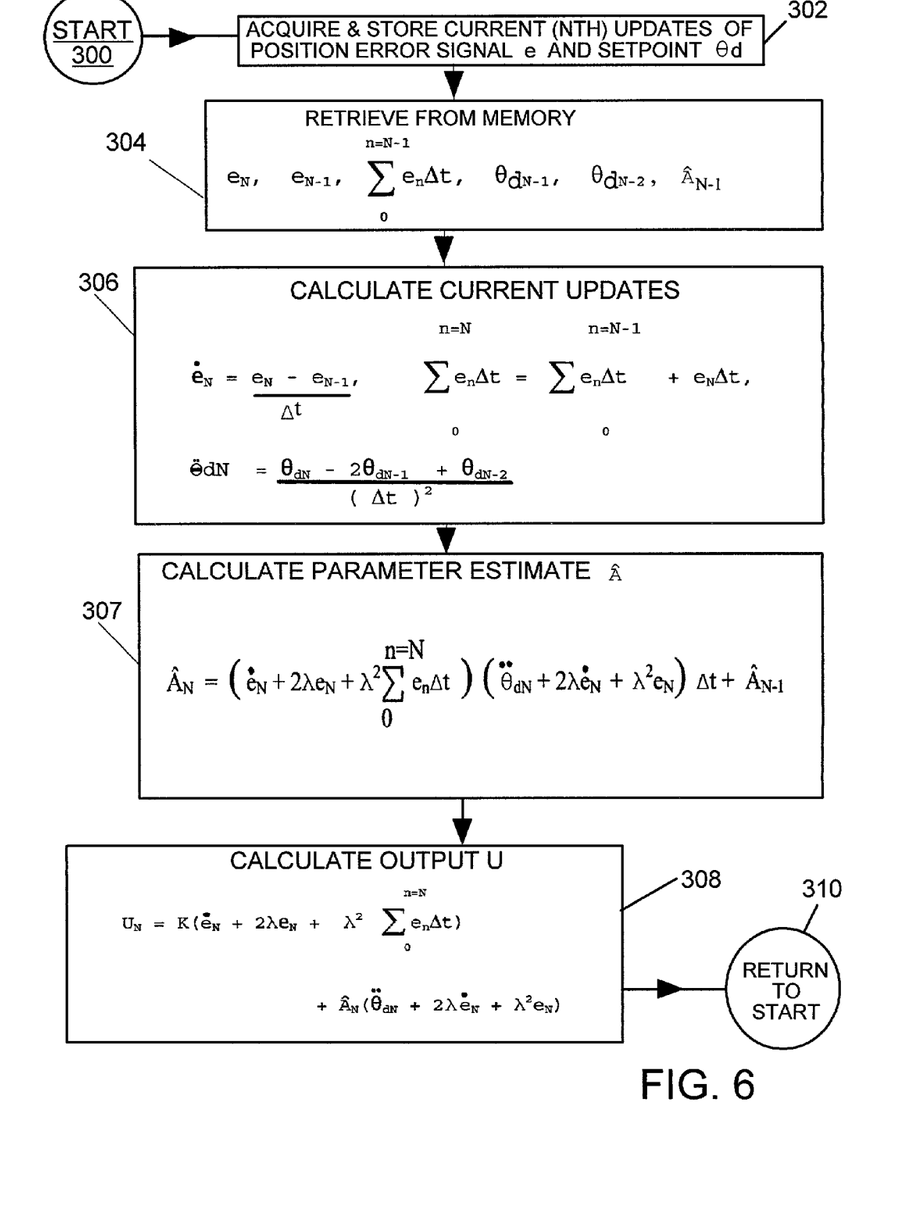
FIG. 6 illustrates a flow chart of an embodiment of a digital or discrete method of adaptive control.

In FIG. 6, a flow chart schematically illustrates how the continuous adaptive control equations are implemented in a discrete process or digital circuitry. The process starts at 300. At 302, a current (Nth) update of the position error signal $e_N$ and the setpoint $2_{dN}$ are acquired and stored in memory. Next, current and past values are retrieved from memory at 304 so they are available for real time calculations. At 306, digital calculations are executed to calculate first derivative of e, an integral of e, and a second derivative of $2_d$ using the values retrieved at 304. At 308, an updated controller output UN is calculated using the values obtained at 306. At 310, process flow returns to 300 to execute the calculations again for the N+1 update. The process flow is iterative or repetitive. The values of Â are updated in a discrete calculations as illustrated at 307 in FIG. 6. The formula in 307 is as follows:

$$\hat{A}_N = \left( \dot{e}_N + 2\lambda e_N + \lambda^2 \sum_{0}^{n=N} e_n \Delta t \right) \left( \ddot{\theta}_N + 2\lambda \dot{e}_N + \lambda^2 e_N \right) \Delta t + \hat{A}_{N-1} \quad \text{Eq. 33}$$

Adaptive parameter data Â is updated digitally in real time using instructions stored in a computer readable program storage device.

In FIG. 7, the example adaptive controller 201 of FIG. 3 is simulated after startup with an initial error of 5% in the parameter Â. The horizontal axes 312 are time and the vertical axis 314 is error e and the vertical axis 316 is the parameter Â. A 250 Hz sinusoidal signal is used as the reference signal. The tracking error converges almost exponentially to zero at 316 and the parameter estimate reaches its true value in the presence of the persistent 250 Hz sinusoidal excitation. The plant parameter also converges to its actual value in about 5 milliseconds as shown at 318. The adaptive controller uses full state feedback. In the simulation, angular velocity is computed using backward differences. The adaptive controller is simple and computationally economical. The control algorithm is implemented using Equation 22 and the adaptation is implemented using Equation 32, both of which are mathematically simple to compute. This technique can be used on disc drives as the servo algorithm itself or as an automated tuning algorithm used in the manufacturing process to calculate gain scheduling tables when it is desirable to have a constant gain controller in a region of operation.

In summary, a disc drive (200) includes a controller circuit 132 that controls an actuator position ($\theta_m$) and includes a first circuit input (216) adapted to receive reference data indicating a desired actuator position "$\theta_d$". The disc drive (200) also includes a second circuit input (218) adapted to receive error data indicating a difference "e" between a desired actuator position and a sensed actuator position "$\theta$". The disc drive (200) also includes a third circuit input (212) adapted to receive adaptive parameter data "Â". The circuit generates a circuit output "u" (203) that couple to the actuator (204). The disc drive (200) includes a controller (132) that calculates the circuit output "u" according to the equation 22 in which "$\lambda$" is a controller zero value and "k" is a controller gain value and "t" is time.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent of the broad general meaning of the terms in which the appended claims are expressed. For example, the controller may perform other functions in addition to the functions described herein, and the controller may be embodied in a combination of hardware, firmware and software to adapt it to a particular application, and different types of actuators and data storage media can be used, without departing from the scope and spirit of the present invention.

What is claimed is:

1. An apparatus for adaptively generating an output responsive to a sensed position signal, a desired position signal and at least one of a torque and an inertia wherein the apparatus further comprises a discrete controller circuit that has a controller gain that is adapted in a fixed range as a function of adaptive parameter data and further comprises an actuator, and wherein the output comprises a controlled electric current coupled to the actuator.

2. The apparatus of claim 1 further comprising:
an adaptive system generating the adaptive parameter data according to an update equation.

3. The apparatus of claim 2 wherein the adaptive system generates the adaptive parameter data based on both the torque and the inertia.

4. The apparatus of claim 1 wherein the controlled electric current is controlled by pulse width modulation.

5. The apparatus of claim 1 wherein the discrete controller circuit further comprises a digital-to-analog converter providing the controlled electric current.

6. The apparatus of claim 1 wherein the sensed position signal is derived from a read/write head.

7. An apparatus comprising:
adaptive parameter data based on at least one of a torque and an inertia; and
a controller circuit for receiving a sensed position signal sensed by a read/write head and adapted to receive reference data indicating a desired position, for adaptively generating an output which is based on the adaptive parameter data, the controller circuit providing a controller gain that is adapted in a fixed range as a function of adaptive parameter data.

8. The apparatus of claim 7 wherein the controller circuit comprises first and second controllers that are stable.

9. The apparatus of claim 8 wherein the first and second controllers use an error model.

10. A method comprising the steps of adaptively generating a controlled electric current output responsive to a sensed position signal, a desired position signal and at least one of a torque and an inertia and providing a controller gain that is adapted in a fixed range as a function of adaptive parameter data, and coupling the controlled electric current output to an actuator.

11. The method of claim 10 wherein the output is controlled based on adaptive parameter data.

12. The method of claim 11 wherein the adaptive parameter data is updated based on at least one of a torque and an inertia.

13. A method comprising the step of adaptively generating an output responsive to a sensed position signal, a desired position signal and at least one of a torque and an inertia, wherein the output is controlled based on adaptive parameter data that is updated based on at least one of a torque and an inertia, and wherein adaptive parameter data is updated digitally in real time using instructions stored in a computer readable program storage device.

14. The method of claim 13 wherein the output is coupled to a voice coil motor in a disc drive.

* * * * *